US010724773B2

(12) United States Patent
Suemitsu et al.

(10) Patent No.: US 10,724,773 B2
(45) Date of Patent: Jul. 28, 2020

(54) TURBO FREEZING MACHINE AND START-UP CONTROL METHOD THEREFOR

(71) Applicant: MITSUBISHI HEAVY INDUSTRIES THERMAL SYSTEMS, LTD., Tokyo (JP)

(72) Inventors: Ryosuke Suemitsu, Tokyo (JP); Yasushi Hasegawa, Tokyo (JP)

(73) Assignee: MITSUBISHI HEAVY INDUSTRIES THERMAL SYSTEMS, LTD., Tokyo (JP)

(*) Notice: Subject to any disclaimer, the term of this patent is extended or adjusted under 35 U.S.C. 154(b) by 105 days.

(21) Appl. No.: 16/091,151

(22) PCT Filed: Apr. 25, 2017

(86) PCT No.: PCT/JP2017/016403
§ 371 (c)(1),
(2) Date: Oct. 4, 2018

(87) PCT Pub. No.: WO2017/208685
PCT Pub. Date: Dec. 7, 2017

(65) Prior Publication Data
US 2019/0128580 A1    May 2, 2019

(30) Foreign Application Priority Data

May 31, 2016    (JP) .................. 2016-108510

(51) Int. Cl.
*F25B 43/02*    (2006.01)
*F25B 1/053*    (2006.01)
(Continued)

(52) U.S. Cl.
CPC .......... *F25B 43/02* (2013.01); *F04D 27/007* (2013.01); *F04D 27/0246* (2013.01);
(Continued)

(58) Field of Classification Search
CPC ...... F25B 1/053; F25B 31/004; F25B 41/003; F25B 43/02; F25B 49/02; F25B 2400/08;
(Continued)

(56) References Cited

U.S. PATENT DOCUMENTS

| 4,404,811 A | 9/1983 | Mount et al. |
| 4,404,812 A | 9/1983 | Zinsmeyer |

(Continued)

FOREIGN PATENT DOCUMENTS

| JP | 6-147122 A | 5/1994 |
| JP | 2009-185710 A | 8/2009 |
| JP | 2009-186030 A | 8/2009 |

OTHER PUBLICATIONS

International Search Report (Form PCT/ISA/210), dated Jul. 11, 2017, for International Application No. PCT/JP2017/016403, with an English translation.
(Continued)

*Primary Examiner* — Marc E Norman
(74) *Attorney, Agent, or Firm* — Birch, Stewart, Kolasch & Birch, LLP

(57) ABSTRACT

The present invention is provided with: a turbo compressor that compresses a refrigerant; a condenser that condenses the refrigerant compressed by the turbo compressor; an expansion valve that expands a liquid refrigerant introduced from the condenser; an evaporator that evaporates the refrigerant expanded by the expansion valve; an oil tank that stores a lubricating oil supplied to the turbo compressor; a pressure equalizing pipe that connects the oil tank and the evaporator; and a control unit that controls start-up. The control unit calculates the amount of a refrigerant eluded into the lubricating oil in the oil tank at the time of start-up, and reduces a pressure reduction speed in the oil tank by limiting the
(Continued)

opening operation of an IGV when the refrigerant elution amount per prescribed time exceeds a prescribed value.

4 Claims, 3 Drawing Sheets

(51) Int. Cl.
 *F25B 41/00* (2006.01)
 *F04D 27/02* (2006.01)
 *F25B 49/02* (2006.01)
 *F04D 27/00* (2006.01)
 *F04D 29/063* (2006.01)
 *F04D 29/46* (2006.01)
 *F25B 31/00* (2006.01)

(52) U.S. Cl.
 CPC ....... *F04D 27/0261* (2013.01); *F04D 29/063* (2013.01); *F04D 29/46* (2013.01); *F25B 1/053* (2013.01); *F25B 41/003* (2013.01); *F25B 49/02* (2013.01); *F25B 31/004* (2013.01); *F25B 2400/08* (2013.01); *F25B 2500/19* (2013.01); *F25B 2500/26* (2013.01); *F25B 2600/0272* (2013.01); *F25B 2700/1932* (2013.01); *F25B 2700/2105* (2013.01)

(58) Field of Classification Search
 CPC .............. F25B 2500/19; F25B 2500/26; F25B 2600/0272; F25B 2700/1932; F25B 2700/2105; F04D 27/007; F04D 27/0246; F04D 27/0261; F04D 29/063; F04D 29/46
 See application file for complete search history.

(56) References Cited

U.S. PATENT DOCUMENTS

| | | |
|---|---|---|
| 4,829,786 A | 5/1989 | Sand et al. |
| 5,066,197 A | 11/1991 | Champagne |
| 5,211,542 A | 5/1993 | Fraser et al. |
| 2009/0193841 A1 | 8/2009 | Sugitani |
| 2019/0078811 A1* | 3/2019 | Miyoshi ................... F25B 1/04 |

OTHER PUBLICATIONS

Written Opinion of the International Searching Authority(Form PCT/ISA/237), dated Jul. 11, 2017, for International Application No. PCT/JP2017/016403, with an English translation.

* cited by examiner

TURBO FREEZING MACHINE AND START-UP CONTROL METHOD THEREFOR

TECHNICAL FIELD

The present invention relates to a centrifugal chiller having an oil tank which stores a lubricant supplied to a turbo compressor and a start-up control method therefor.

BACKGROUND ART

In the related art, an HFC refrigerant used for a centrifugal chiller has a Global Warming Potential (GWP) value in the hundreds to thousands, and thus, it is necessary to switch from the HFO refrigerant having a GWP value in the hundreds to thousands of GWP to an HFO refrigerant having a GWP value of one digit in consideration of an environment. In order to cope with this, a low pressure refrigerant such as HFO-1233zd (E) without combustibility may be used as a refrigerant for a chiller.

In general, the centrifugal chiller has an oil tank in which a lubricant supplied to the turbo compressor is stored. The oil tank is equalized to a low pressure side (evaporator side) of the centrifugal chiller, and thus, in a case where a low pressure refrigerant is used, if a pressure in the oil tank is equal to or less than the atmospheric pressure, a gas volume increases. That is, compared to a chiller which uses a high pressure refrigerant, in a chiller which uses a low pressure refrigerant, in a case where a pressure of the refrigerant having the same mass dissolved into the lubricant in the oil tank decreases and the refrigerant evaporates, a volume of the evaporated refrigerant increases, and foaming easily occurs in the lubricant in the oil tank. Particularly, at the time of start-up where a pressure reduction speed on a low pressure side is large, foaming easily occurs in the lubricant in the oil tank.

PTL 1 discloses that when a turbo compressor starts-up, after the start-up is performed at an opening degree at which an opening degree of a suction capacity controller is smaller than a target opening degree, the opening degree rapidly increases to the target opening degree such that an operation time in which the opening degree is less than the target opening degree can be set as short as possible to reduce a passage resistance of the refrigerant, and a decrease in a pressure on a downstream side of the suction capacity controller is suppressed so as to suppress the occurrence of foaming.

CITATION LIST

Patent Literature

[PTL 1] Japanese Unexamined Patent Application Publication No. 2009-186030

SUMMARY OF INVENTION

Technical Problem

However, the refrigerant dissolution amount with respect to the lubricant depends on the value of the pressure even at the same pressure reduction speed, and thus, the refrigerant elution amount from the lubricant depends on the pressure in the oil tank. In addition, the refrigerant dissolution amount with respect to the lubricant depends on a temperature. Accordingly, it is required to more reliably suppress the foaming in the oil tank.

The present invention is made in consideration of the above-described circumstances, and an object thereof is to provide a centrifugal chiller capable of more reliably suppressing the foaming in the oil tank and a start-up control method therefor.

Solution to Problem

In order to achieve the object, a centrifugal chiller of the present invention and a start-up control method therefor adopt the following means.

That is, according to an aspect of the present invention, there is provided a centrifugal chiller including: a turbo compressor which compresses a refrigerant; a condenser which condenses the refrigerant compressed by the turbo compressor; an expansion valve which expands a liquid refrigerant introduced from the condenser; an evaporator which evaporates the refrigerant expanded by the expansion valve; an oil tank which stores a lubricant to be supplied to the turbo compressor; a pressure equalizing pipe which connects the oil tank and the evaporator to each other; and a controller which controls start-up, in which at the time of the start-up, the controller calculates an elution amount of the refrigerant eluted from the refrigerant dissolved into the lubricant in the oil tank, and decreases a pressure reduction speed in the oil tank in a case where the refrigerant elution amount per a predetermined time period exceeds a predetermined value.

At the time of the start-up, the turbo compressor is operated, and the pressure in the evaporator decreases. Accordingly, the pressure in the oil tank connected to the evaporator via the pressure equalizing pipe decreases. However, if the pressure reduction speed in the oil tank increases, elution of the refrigerant dissolved into the lubricant in the oil tank increases, and there is a concern that foaming occurs.

In the present invention, at the time of the start-up, in the case where the refrigerant elution amount per a predetermined time period exceeds the predetermined value, it is determined that there is a concern that the foaming occurs, and the pressure reduction speed in the oil tank decreases. Accordingly, the foaming in the oil tank is suppressed, lowering of an oil level in the oil tank is prevented, and thus, it is possible to avoid a lubrication failure of the turbo compressor. In addition, the oil level in the oil tank is not lowered, it is not necessary to add the lubricant so as to recover a predetermined oil level, and it is possible to suppress an increase in a cost.

In addition, in the centrifugal chiller of the present invention, the turbo compressor may include suction refrigerant control means for controlling a flow rate of the refrigerant sucked by the turbo compressor, and the controller may decrease the pressure reduction speed in the oil tank by decreasing the flow rate of the sucked refrigerant by the suction refrigerant control means.

In order to decrease the pressure reduction speed in the oil tank, it is preferable to control the suction refrigerant control means provided in the turbo compressor. Specifically, at the time of the start-up, the suction refrigerant control means is controlled in an opening direction in which the flow rate of the refrigerant increases. However, in the case where the pressure reduction speed exceeds the predetermined value, the operation of the suction refrigerant control means in the opening direction is regulated. For example, the opening operation of the suction refrigerant control means is temporarily stopped or a speed of the opening operation decreases.

As the suction refrigerant control means, there is the inlet guide vane (IGV) provided on an upstream side of the impeller of the turbo compressor.

In addition, it is possible to decrease the pressure reduction speed by decreasing the rotating speed of the turbo compressor or controlling the opening degree of the expansion valve in the opening direction.

Moreover, in the centrifugal chiller of the present invention, the oil tank may include a temperature sensor and a pressure sensor, refrigerant dissolution amount information indicating a relationship between a temperature and a pressure, and a refrigerant dissolution amount with respect to the lubricant may be stored in the controller, and the controller may calculate the refrigerant elution amount, based on an oil tank temperature obtained from the temperature sensor, an oil tank pressure obtained from the pressure sensor, and the refrigerant dissolution amount information.

The refrigerant dissolution amount with respect to the lubricant depends on the pressure and the temperature. In addition, the refrigerant dissolution amount information indicating the relationship between the pressure and the temperature, and the refrigerant dissolution amount is stored in the controller, and the refrigerant elution amount is calculated based on the measurement results from the pressure sensor and the temperature sensor of the oil tank. Accordingly, it is possible to obtain the refrigerant elution amount for each predetermined time, and it is possible to reliably suppress the occurrence of the foaming.

In addition, in the centrifugal chiller of the present invention, in a case where the refrigerant elution amount per the predetermined time is equal to or less than the predetermined value, the controller may increase the pressure reduction speed in the oil tank.

In a case where the refrigerant elution amount per a predetermined time period is equal to or less than the predetermined value, it is determined that a possibility of occurrence in the foaming is low, and the pressure reduction speed in the oil tank increases. Accordingly, it is possible to speed up the start-up by returning the start-up to a normal start-up sequence.

In addition, according to another aspect of the present invention, there is provided a start-up method for a centrifugal chiller including a turbo compressor which compresses a refrigerant, a condenser which condenses the refrigerant compressed by the turbo compressor, an expansion valve which expands a liquid refrigerant introduced from the condenser, an evaporator which evaporates the refrigerant expanded by the expansion valve, an oil tank which stores a lubricant to be supplied to the turbo compressor, and a pressure equalizing pipe which connects the oil tank and the evaporator to each other, the method including: at the time of start-up, calculating an elution amount of the refrigerant eluted from the refrigerant dissolved into the lubricant in the oil tank, and decreasing a pressure reduction speed in the oil tank in a case where the refrigerant elution amount per a predetermined time exceeds a predetermined value.

Advantageous Effects of Invention

In a case where a refrigerant elution amount per a predetermined time period exceeds a predetermined value with respect to a lubricant in an oil tank, it is possible to reliably suppress foaming in the oil tank by decreasing a pressure reduction speed in the oil tank.

DESCRIPTION OF EMBODIMENTS

Hereinafter, an embodiment according to the present invention will be described with reference to the drawings.

Figure 1:
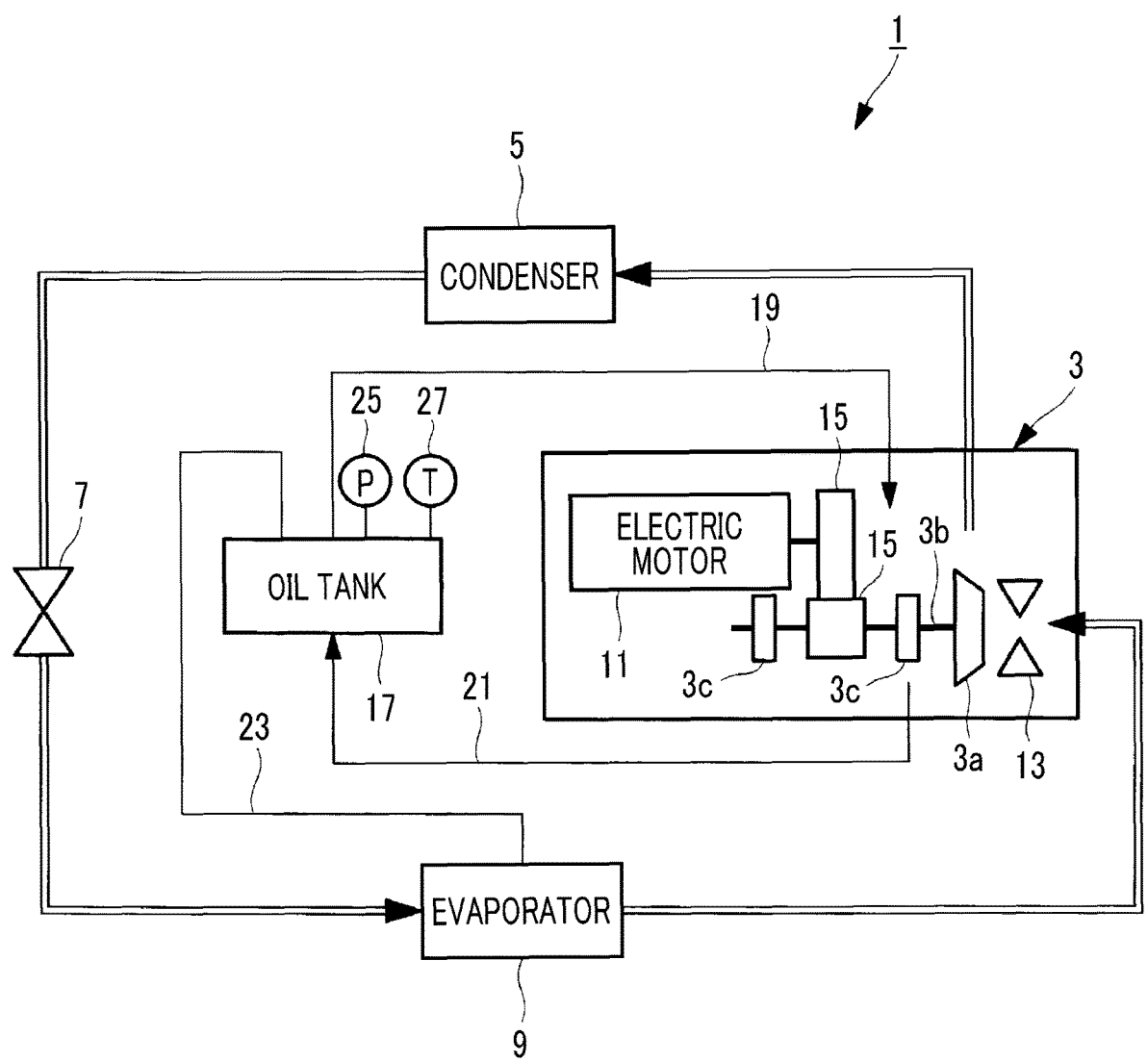
FIG. 1 is a schematic configuration diagram showing a centrifugal chiller according to an embodiment of the present invention.

As shown in FIG. 1, a centrifugal chiller 1 includes a turbo compressor 3 which compresses a refrigerant, a condenser 5 which condenses a high-temperature and high-pressure gas refrigerant compressed by the turbo compressor 3, an expansion valve 7 which expands a liquid refrigerant introduced from the condenser 5, and an evaporator 9 which evaporates the liquid refrigerant expanded by the expansion valve 7.

As the refrigerant, a low pressure refrigerant referred to as HFO-1233zd (E) is used.

The turbo compressor 3 is a centrifugal compressor and is driven by an electric motor 11 whose rotating speed is controlled by an inverter. An output of the inverter is controlled by a controller (not shown). An inlet guide vane (suction refrigerant control means: hereinafter, referred to as "IGV") 13 which controls a flow rate of a sucked refrigerant is provided in a refrigerant suction port of the turbo compressor 3, and thus, capacity of the centrifugal chiller 1 can be controlled by the IGV 13. An opening degree control of the IGV 13 is performed by the controller.

The turbo compressor 3 includes an impeller 3a which rotates around a rotary shaft 3b. Rotational power is transmitted from the electric motor 11 to the rotary shaft 3b via a speed increasing gear 15. The rotary shaft 3b is supported by a bearing 3c.

The condenser 5 is a shell and tube type heat exchanger or a plate type heat exchanger.

Cooling water for cooling the refrigerant is supplied to the condenser 5. Heat of the cooling water introduced to the condenser 5 is discharged to the outside by a cooling tower (not shown) or an air heat exchanger (not shown), and thereafter, the cooling water is introduced to the condenser 5 again.

The expansion valve 7 is an electric expansion valve, and an opening degree of the expansion valve 7 is set to a predetermined value by the controller.

The evaporator 9 is a shell and tube type evaporator or a plate type evaporator. Chilled water supplied to an external load (not shown) is introduced to the evaporator 9. The chilled water is cooled to a rated temperature (for example, 7° C.) by heat exchange between the chilled water and the refrigerant in the evaporator 9, and is fed to the external load.

The lubricant is supplied from the oil tank 17 to the bearing 3c of the turbo compressor 3 or the speed increasing gear 15. For example, as the lubricant, a mineral oil having a viscosity grade of 100 is used.

An oil pump (not shown) is provided in the oil tank 17, and thus, the lubricant is supplied through an oil supply pipe 19 at a predetermined flow rate. The lubricant which has lubricated the inside of the turbo compressor 3 is returned to the oil tank 17 via an oil return pipe 21.

A pressure equalizing pipe 23 which communicates with a portion between the oil tank 17 and the evaporator 9 is provided between the oil tank 17 and the evaporator 9, and a pressure in the oil tank 17 and a pressure in the evaporator 9 are equalized to each other. In this way, the pressure in the oil tank 17 decreases, and thus, a refrigerant dissolution amount with respect to the lubricant is kept low.

A pressure sensor 25 and a temperature sensor 27 are provided in the oil tank 17. The pressure in the oil tank 17 is measured by the pressure sensor 25, and a measurement result is output to the controller. The temperature (specifically, the temperature of the lubricant) in the oil tank 17 is measured by the temperature sensor 27, and a measurement result is output to the controller.

The controller controls an operation of the centrifugal chiller 1 such as a start-up control or the like of the centrifugal chiller 1 and includes, for example, a Central Processing Unit (CPU), a Random Access Memory (RAM), a Read Only Memory (ROM), a computer readable storage medium, or the like. For example, a series of processing for realizing various functions is stored in a storage medium or the like in the form of a program. The CPU causes a RAM or the like to read the program and executes information processing/calculation processing to realize various functions. The program may be installed in the ROM or other storage mediums in advance, may be provided in a state of being stored in a computer readable storage medium, or may be delivered via wired or wireless communication means. The computer-readable storage medium is a magnetic disk, a magneto-optical disk, a CD-ROM, a DVD-ROM, a semiconductor memory, or the like.

Figure 2:
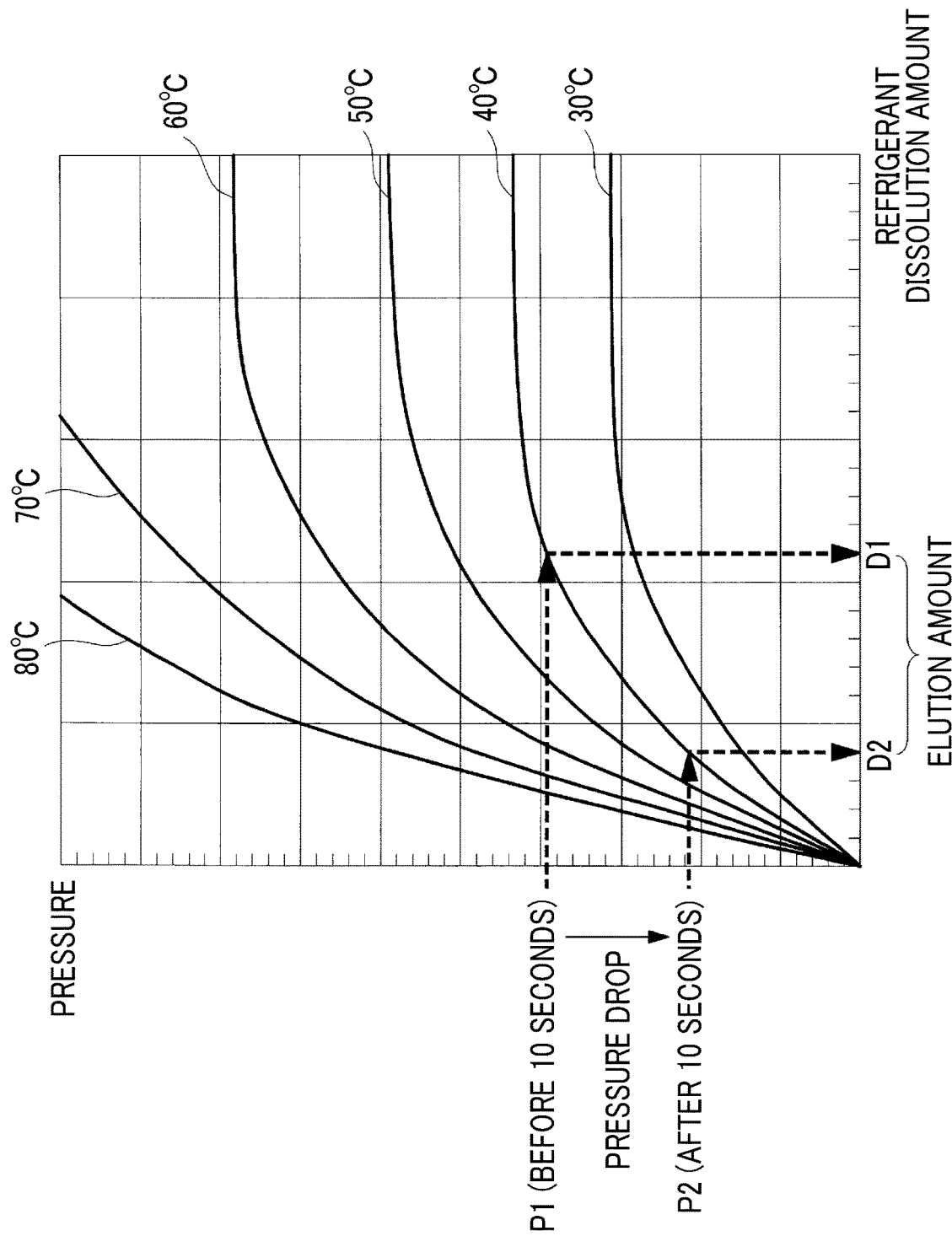
FIG. 2 is a graph showing a relationship between a pressure and a temperature, and a refrigerant dissolution amount.

In the controller, as shown in FIG. 2, refrigerant dissolution amount information relating to the refrigerant dissolution amount is stored in a storage area. In addition, a description format of this refrigerant dissolution amount information may be a map format or a relational expression using an approximate expression or the like.

In FIG. 2, a horizontal axis indicates the refrigerant dissolution amount indicating the dissolution amount of the refrigerant with respect to the lubricant, and a vertical axis indicates a pressure. Each curve shown in FIG. 2 indicates the refrigerant dissolution amount at each temperature. As can be seen from FIG. 2, each curve has a convex shape, the refrigerant dissolution amount decreases as the pressure decreases, and a change in the refrigerant dissolution amount decreases as the pressure decreases. In addition, in a case where comparison is performed at the same pressure, it is understood that the refrigerant dissolution amount decreases as the temperature increases.

As shown in FIG. 2, the controller calculates the refrigerant elution amount at each time using the refrigerant dissolution amount information. Here, the refrigerant elution amount means an amount [% by weight] of the refrigerant which is dissolved into the lubricant to be gasified and is discharged from the lubricant.

As shown in FIG. 2, in a case where the temperature in the oil tank 17 measured by the temperature sensor 27 is 40° C., a refrigerant dissolution amount D1 is obtained from a pressure P1 before 10 seconds measured by the pressure sensor 25, a refrigerant dissolution amount D2 is obtained from a decreased pressure P2 after 10 seconds measured by the pressure sensor 25, and thereafter, the refrigerant elution amount is calculated from a difference (D1−D2) therebetween. In this way, in the controller, the calculation of the refrigerant elution amount is performed at predetermined time intervals (10 seconds interval in the example of FIG. 2).

Next, the start-up control of the centrifugal chiller 1 having the above-described configuration will be described.

Before the start-up of the centrifugal chiller 1, temperatures of the condenser 5 and the evaporator 9 are near an ambient temperature, and the pressure in the condenser 5 and the pressure in the evaporator 9 are approximately the same as each other. In this state, if the centrifugal chiller 1 starts-up, the turbo compressor 3 is rotated by a command of the controller, and the refrigerant sucked via the IGV 13 is discharged from the turbo compressor 3. The refrigerant discharged from the turbo compressor 3 is fed to the condenser 5, and circulates to be returned to the turbo compressor 3 again through the expansion valve 7 and the evaporator 9. A speed of the turbo compressor 3 is gradually increased by the command of the controller, and accordingly, the IGV 13 is controlled be opened gradually from a fully closed state.

In this way, if the centrifugal chiller 1 starts-up, the pressure in the evaporator 9 gradually decreases. Accordingly, the pressure in the oil tank 17 connected to the evaporator 9 by the pressure equalizing pipe 23 is gradually decreased. The pressure in the oil tank 17 is measured by the pressure sensor 25 to be sent to the controller, and the temperature in the oil tank 17 is measured by the temperature sensor 27 to be sent to the controller.

Figure 3:
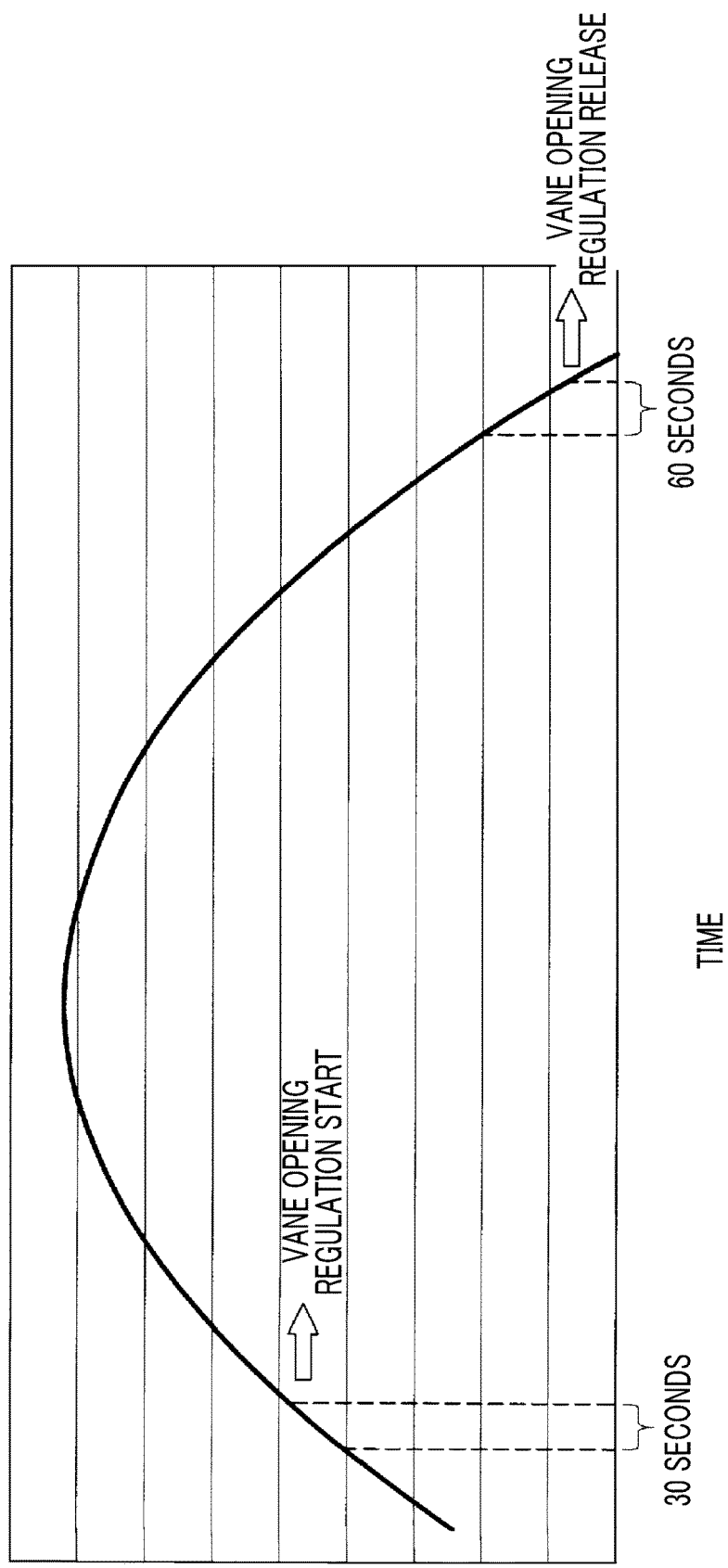
FIG. 3 is a graph showing a temporal change of a refrigerant elution amount at the time of start-up of the centrifugal chiller.

In the controller, as described with reference to FIG. 2, the refrigerant elution amount is calculated for each predetermined time (for example, 10 seconds) from the obtained pressure and temperature of the oil tank 17. FIG. 3 shows an example in which the refrigerant elution amount is calculated at each time and is plotted. As shown in FIG. 3, at the beginning of the start-up, the pressure reduction speed is large. Accordingly, the refrigerant elution amount tends to increase, and thereafter, the pressure reduction speed decreases, and the refrigerant elution amount tends to decrease.

In a case where the refrigerant elution amount per the predetermined time exceeds a predetermined value, for example, in a case where the refrigerant elution amount exceeds the predetermined value during 30 seconds, as shown by a "vane opening regulation start" in FIG. 3, the controller performs the control to stop an opening operation of the IGV 13. In addition, instead of stopping the opening operation of the IGV 13, a speed of the opening operation of the IGV 13 may decrease. Accordingly, the pressure reduction speed in the oil tank 17 decreases or becomes 0, and foaming in the oil tank 17 is prevented in advance.

A start timing of the control for regulating the opening degree of the IGV 13 is determined by obtaining a condition under which foaming occurs in the oil tank 17 by a preliminary test or the like and obtaining the refrigerant elution amount per a predetermined time period which does not reach this condition.

In a case where after the opening degree of the IGV 13 is regulated, the refrigerant elution amount decreases, and the refrigerant elution amount per a predetermined time period is equal to or less than the predetermined value, for example, in a case where the refrigerant elution amount is equal to or less than the predetermined value during 30 seconds, as shown by a "vane opening regulation release" in FIG. 3, the controller performs the control such that the opening operation of the IGV 13 is performed again at a normal speed. Accordingly, it is returned to a normal start-up sequence, and thus, the opening operation of the IGV 13 proceeds, and the start-up operation of the centrifugal chiller 1 is performed.

As described above, according to the present embodiment, the following effects are exerted.

At the time of the start-up of the centrifugal chiller 1, in a case where the refrigerant elution amount per a predetermined time period exceeds the predetermined value, it is determined that there is a concern that the foaming occurs, the opening operation of the IGV 13 is regulated to decrease the pressure reduction speed in the oil tank 17. Accordingly, the foaming in the oil tank 17 is suppressed, lowering of an oil level in the oil tank 17 is prevented, and thus, it is possible to avoid a lubrication failure of the turbo compressor 3. In addition, the oil level in the oil tank 17 is not lowered, it is not necessary to add the lubricant so as to recover a predetermined oil level, and it is possible to suppress an increase in a cost.

The refrigerant dissolution amount with respect to the lubricant depends on the pressure and the temperature. In addition, the refrigerant dissolution amount information between the pressure and the temperature, and the refrigerant dissolution amount is stored in the controller, and the refrigerant elution amount is calculated based on the measurement results from the pressure sensor 25 and the temperature sensor 27 of the oil tank 17. Accordingly, it is possible to obtain the refrigerant elution amount for each predetermined time, and it is possible to reliably suppress the occurrence of the foaming.

In a case where the refrigerant elution amount per a predetermined time period is equal to or less than the predetermined value, it is determined that a possibility of occurrence in the foaming is low, and the pressure reduction speed in the oil tank 17 increases. Accordingly, it is possible to speed up the start-up of the centrifugal chiller 1 by returning the start-up to the normal start-up sequence.

Moreover, in the above-described embodiment, the opening operation of the IGV 13 is regulated to decrease the pressure reduction speed in the oil tank 17. However, instead of this, in addition to the opening operation regulation of the IGV 13, the rotating speed of the turbo compressor 3 may decrease or the opening degree of the expansion valve 7 may be controlled in the opening direction so as to decrease the pressure reduction speed.

In addition, HFO-1233zd (E) is described as an example of the low pressure refrigerant. However, the present invention can be applied to other low pressure refrigerants, or in a case where there is a concern that the foaming occurs in the oil tank, the present invention can be applied to a high pressure refrigerant.

REFERENCE SIGNS LIST

1: centrifugal chiller
3: turbo compressor
3a: impeller
3b: rotary shaft
3c: bearing
5: condenser
7: expansion valve
9: evaporator
11: electric motor
13: IGV (inlet guide vane: suction refrigerant control means)
15: speed increasing gear
17: oil tank
19: oil supply pipe
21: oil return pipe
23: pressure equalizing pipe
25: pressure sensor
27: temperature sensor

The invention claimed is:

1. A centrifugal chiller comprising:
a turbo compressor which compresses a refrigerant;
a condenser which condenses the refrigerant compressed by the turbo compressor;
an expansion valve which expands a liquid refrigerant introduced from the condenser;
an evaporator which evaporates the refrigerant expanded by the expansion valve;
an oil tank which stores a lubricant to be supplied to the turbo compressor;
a pressure equalizing pipe which connects the oil tank and the evaporator to each other; and
a controller which controls start-up,
wherein at the time of the start-up, the controller calculates an elution amount of the refrigerant eluted from the refrigerant dissolved into the lubricant in the oil tank, and decreases a pressure reduction speed in the oil tank in a case where the refrigerant elution amount per a predetermined time period exceeds a predetermined value,
wherein the oil tank includes a temperature sensor and a pressure sensor,
wherein refrigerant dissolution amount information indicating a relationship between a temperature and a pressure, and a refrigerant dissolution amount with respect to the lubricant is stored in the controller,
wherein the controller calculates the refrigerant elution amount, based on an oil tank temperature obtained from the temperature sensor, an oil tank pressure obtained from the pressure sensor, and the refrigerant dissolution amount information, and
wherein a change in the refrigerant elution amount increases as the pressure decreases, and in a case where comparison is performed at the same pressure, the change decreases as the temperature increases.

2. The centrifugal chiller according to claim 1,
wherein the turbo compressor includes suction refrigerant control means for controlling a flow rate of the refrigerant sucked by the turbo compressor, and
wherein the controller decreases the pressure reduction speed in the oil tank by decreasing the flow rate of the sucked refrigerant by the suction refrigerant control means.

3. The centrifugal chiller according to claim 1,
wherein in a case where the refrigerant elution amount per the predetermined time is equal to or less than the predetermined value, the controller increases the pressure reduction speed in the oil tank.

4. A start-up method for a centrifugal chiller including
a turbo compressor which compresses a refrigerant,
a condenser which condenses the refrigerant compressed by the turbo compressor,
an expansion valve which expands a liquid refrigerant introduced from the condenser,
an evaporator which evaporates the refrigerant expanded by the expansion valve,
an oil tank which stores a lubricant to be supplied to the turbo compressor,
a pressure equalizing pipe which connects the oil tank and the evaporator to each other, and
a controller which controls start-up,
the method comprising:
at the time of the start-up, calculating an elution amount of the refrigerant eluted from the refrigerant dissolved into the lubricant in the oil tank, and decreasing a pressure reduction speed in the oil tank in a case where the refrigerant elution amount per a predetermined time period exceeds a predetermined value,
wherein the oil tank includes a temperature sensor and a pressure sensor, wherein refrigerant dissolution amount information indicating a relationship between a temperature and a pressure, and a refrigerant dissolution amount with respect to the lubricant is stored in the controller, wherein the controller calculates the refrigerant elution amount, based on an oil tank temperature obtained from the temperature sensor, an oil tank pressure obtained from the pressure sensor, and the refrigerant dissolution amount information, and wherein a change in the refrigerant elution amount increases as the pressure decreases, and in a case where comparison is performed at the same pressure, the change decreases as the temperature increases.

* * * * *